(12) United States Patent
Nishiyama

(10) Patent No.: US 6,748,124 B1
(45) Date of Patent: Jun. 8, 2004

(54) IMAGE PROCESSING DEVICE USING LINE SENSOR

(75) Inventor: Yasuo Nishiyama, Hino (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/806,155
(22) PCT Filed: Sep. 21, 1999
(86) PCT No.: PCT/JP99/05164
  § 371 (c)(1),
  (2), (4) Date: Mar. 23, 2001
(87) PCT Pub. No.: WO00/17816
  PCT Pub. Date: Mar. 30, 2000

(30) Foreign Application Priority Data

Sep. 24, 1998 (JP) .......... 10-270166

(51) Int. Cl.⁷ .............. G06K 9/20
(52) U.S. Cl. .............. 382/317; 382/149
(58) Field of Search .............. 382/144–149, 382/152, 312, 317; 358/471, 474, 486, 496, 497; 356/614, 624

(56) References Cited

U.S. PATENT DOCUMENTS 4,250,526 A * 2/1981 Fuwa et al. .......... 358/471
6,128,420 A * 10/2000 Shin et al. .......... 382/317

FOREIGN PATENT DOCUMENTS

JP 4-23561 1/1992
JP 8-214128 8/1996

* cited by examiner

Primary Examiner—Yon J. Couso
(74) Attorney, Agent, or Firm—Frishauf, Holtz, Goodman & Chick, P.C.

(57) ABSTRACT

With the present invention, it is possible to provide an image processing system which uses a line sensor capable of achieving an optimal image fetching speed which is in accordance with the image processing capability (image processing speed) without distorting or defocusing the image. The image processing system of the present invention includes an illuminating unit, a line sensor, an optical system, a movement unit, an image processing unit and a control unit. The illuminating unit illuminates the surface of an object to be examined. The line sensor picks up the image of the surface of the object. The optical system forms the image of the surface of the object on the line sensor. The movement unit moves the illuminating unit, the line sensor and the optical system relative to the object. The image processing unit processes an image signal from the line sensor. The control unit at least controls the clock rate of the line sensor and the movement speed of the movement means.

22 Claims, 2 Drawing Sheets

IMAGE PROCESSING DEVICE USING LINE SENSOR

This application is a U.S. National Phase Application under 35 USC 371 of International Application PCT/JP99/05164 (not published in English) filed Sep. 21, 1999.

TECHNICAL FIELD

The present invention relates to an image processing system which uses a line sensor, and more specifically to an image processing system for processing an image signal fetched with use of a line sensor so as to detect a defect of the pattern of a printed circuit, thus examining the appearance of an object.

BACKGROUND ART

FIG. 4 is a block diagram showing an image processing system which uses a conventional line sensor, for processing an image signal fetched with use of the line sensor, in order to detect a defect of the pattern of a printed circuit, thus examining the appearance of an object.

That is, as shown in FIG. 4, an object 2 is placed on a conveying belt 1, and it is moved as driven by a conveying motor 3.

Further, an illumination device 4, an optical system 5 and a line sensor 6 are built as an integral unit in an X-Y stage 7.

When the object 2 is conveyed to a predetermined test position, the conveying motor 3 stops. When the object 2 reaches the test position, the X-Y stage 7 moves two dimensionally.

Thus, the line sensor 6 moves relative to the object 2, and the image signal within a predetermined test range is fetched in an image processing unit 8 of a main central processing unit (CPU) 9. Then, the image signal is processed by the image processing unit 8, and thus a defect on the surface of the object 2 is detected.

The above-described operation is controlled by the main CPU 9.

More specifically, the movement of the X-Y stage 7 is controlled by an X-Y stage controller 10 as being instructed by the main CPU 9.

Further, the timing for fetching an image by the line sensor 6 is controlled by a clock signal supplied from a line sensor clock generator 11.

Here, in connection with the relation between a clock signal supplied to the line sensor 6 and the movement speed of the X-Y stage 7, a size y per one pixel on a surface of an object 2 is expressed by:

$$y = mx \quad (1)$$

where x represents a size of an image pick-up element of the line sensor 6 and m represents a magnification of the optical system 5.

On the other hand, the movement speed v of the X-Y stage is expressed by:

$$v = y/L \quad (2)$$

where L represents a line rate (time) of the line sensor 6.

The line rate L of the line sensor 6 is expressed approximately by:

$$L = ca \quad (3)$$

where a represents the number of pixels of one line, and c represents the clock rate (time) of a pixel.

From the above formulas (1), (2) and (3), the movement speed v of the X-Y stage 7 is expressed by:

$$v = (mx)/(ca) \quad (4).$$

From the formula (4), when the magnification of the optical system 5 does not change, the clock rate of a clock signal supplied to the line sensor 6, and the movement speed of the X-Y stage 7 are univocally determined.

Under the circumstance, the applicant of the present invention has found that it is necessary to change the movement speed of the X-Y stage 7 as well, when the clock rate of the clock signal supplied to the line sensor 6 is varied.

That is, the clock rate of the line sensor 6 has an influence on the transfer speed of the image signal to the image processing unit 8. When the image processing speed of the image processing unit 8 is low with respect to the transfer speed of the image signal, it is necessary to lower the clock rate of the line sensor 6 so that the transfer speed of the image signal to the image processing unit 8 is matched with the image processing speed of the image processing unit 8.

Here, as described above, the clock rate of the line sensor 6 and the movement speed of the X-Y stage 7 are univocally related, and therefore if the clock rate is changed, the movement speed of the X-Y stage 7 must be changed accordingly.

However, conventionally, even if the clock rate of the line sensor 6 is changed, the movement speed of the X-Y stage 7 has never been varied so as to satisfy the formula (4).

Therefore, in the case where the clock signal supplied to the line sensor 6 and the movement speed of the X-Y stage 7 do not satisfy the above-described relationship, an image reproduced from an image signal fetched by the line sensor 6 will become a distorted one as being expanded/compressed in the scanning direction, or a defocused one.

If the image processing is carried out on the basis of such an image, there may arise a problem of not being able to perform an accurate image processing, for example, the defect detection is excessively carried out or on the other hand, no defect detection is carried out.

As a solution to such a problem, the conventional technique sets the image transfer speed to a low level in advance in accordance with the image processing speed of the image processing unit 8; however this measure creates a new problem of a test time being prolonged.

DISCLOSURE OF THE INVENTION

The present invention has been proposed in consideration of the above-described problems of the conventional technique, and the object thereof is to provide an image processing system which uses a line sensor capable of achieving an optimal image fetching speed in accordance with the image processing performance (image processing speed) without having an image distorted or defocused.

In order to achieve the above-described object, according to an aspect of the present invention, there is provided:

(1) An image processing system characterized by comprising:

illumination means for illuminating a surface of an object to be examined;

a line sensor for picking up an image of the surface of the object;

an optical system for imaging the image of the surface of the object on the line sensor;

movement means for moving the illumination means and the optical system relative to the object;

image processing means for processing an image signal from the line sensor;

clock signal generating means capable of changing the clock rate of the clock signal supplied to the line sensor; and controlling means for controlling the movement speed of the movement means and the clock rate of the liner sensor such as to satisfy a relational formula:

$$v=(mx)/(ca)$$

where m: the magnification of the optical system x: the size of an imaging element of the line sensor, and a: the number of pixels on one line of the line sensor, thereby adjusting the image signal transfer speed of the line sensor to match the processing speed of the image processing means.

In the above-described invention (1), the movement speed of the movement means and the clock rate of the liner sensor are controlled such as to satisfy a relational formula:

$$v=(mx)/(ca)$$

where m: the magnification of the optical system x: the size of an imaging element of the line sensor, and a: the number of pixels on one line of the line sensor, thereby adjusting the image signal transfer speed of the line sensor to match the processing speed of the image processing means. Thus, the image fetching speed can be optimized, and the distortion or defocusing of the image can be avoided.

According to another aspect of the present invention, there is provided an image processing system (2) according to the above (1), characterized in that:

the controlling means changes the clock rate (c) of the line sensor such as to satisfy a relational formula: v=(mx)/(ca) in accordance with a change in at least one of the movement speed (v) of the movement means and the magnification (m) of the optical system.

According to still another aspect of the present invention, there is provided an image processing system (3) according to the above (1), characterized in that:

the controlling means changes at least one of the movement speed (v) of the movement means and the magnification (m) of the optical system such as to satisfy a relational formula: v=(mx)/(ca) in accordance with a change in the clock rate (c) of the line sensor.

According to still another aspect of the present invention, there is provided an image processing system (4) according to the above (1), characterized in that:

the clock signal generating means is controlled by the main central processing unit (CPU) which includes the image processing means.

In the inventions of the above-described aspects, the clock rate of the liner sensor is controlled by the controlling means in relation to the processing speed of the image processing means or the movement speed of the movement means, and therefore the clock rate of the liner sensor can be optimized.

According to still another aspect of the present invention, there is provided an image processing system (5) according to the above (1), characterized in that:

the clock signal generating means is controlled by the controller of the movement means.

According to still another aspect of the present invention, there is provided an image processing system (6) according to any one of the above (1), (4) and (5), characterized in that:

parallel input ports of a plurality of bits, which correspond to parallel output ports of a plurality of bits, are assigned to the clock signal generating means, and a line sensor clock generator is used as means for supplying a clock signal to the line sensor, on the basis of the clock selection signal from the parallel output ports.

According to still another aspect of the present invention, there is provided an image processing system (7) according to the above (6), characterized in that:

the parallel output ports are assigned to the main central processing unit (CPU) including the image processing means, the parallel input ports are assigned to the clock signal generating means, and a clock rate pattern which corresponds to each of clock selection instruction signals of a plurality of bits, transmitted/received between the parallel output ports and the parallel input ports, is selected.

According to still another aspect of the present invention, there is provided an image processing system (8) according to the above (6), characterized in that:

the movement means includes a controller driven and controlled by the CPU;

the parallel output ports for transmitting the clock selection instruction signals of said plurality of bits, are assigned to the controller;

the parallel input ports for receiving the clock selection instruction signals of said plurality of bits, are assigned to the clock signal generating means; and a clock rate pattern which corresponds to each of clock selection instruction signals of a plurality of bits, transmitted/received between the parallel output ports and the parallel input ports, is selected.

According to still another aspect of the present invention, there is provided an image processing system (9) according to any one of the above (6) to (8), characterized in that:

the clock selection instruction signal is sent to the parallel output ports of said plurality of bits from a predetermined number of transistors provided in the main CPU.

According to still another aspect of the present invention, there is provided an image processing system (10) according to the above (6), characterized in that:

a predetermined number of photo-couplers provided in the line sensor clock generator are connected to the parallel output ports of said plurality of bits, and clock signals are supplied from the photo-couplers via respective amplifiers to the line sensor.

BEST MODE FOR CARRYING OUT OF THE INVENTION

Figure 1:
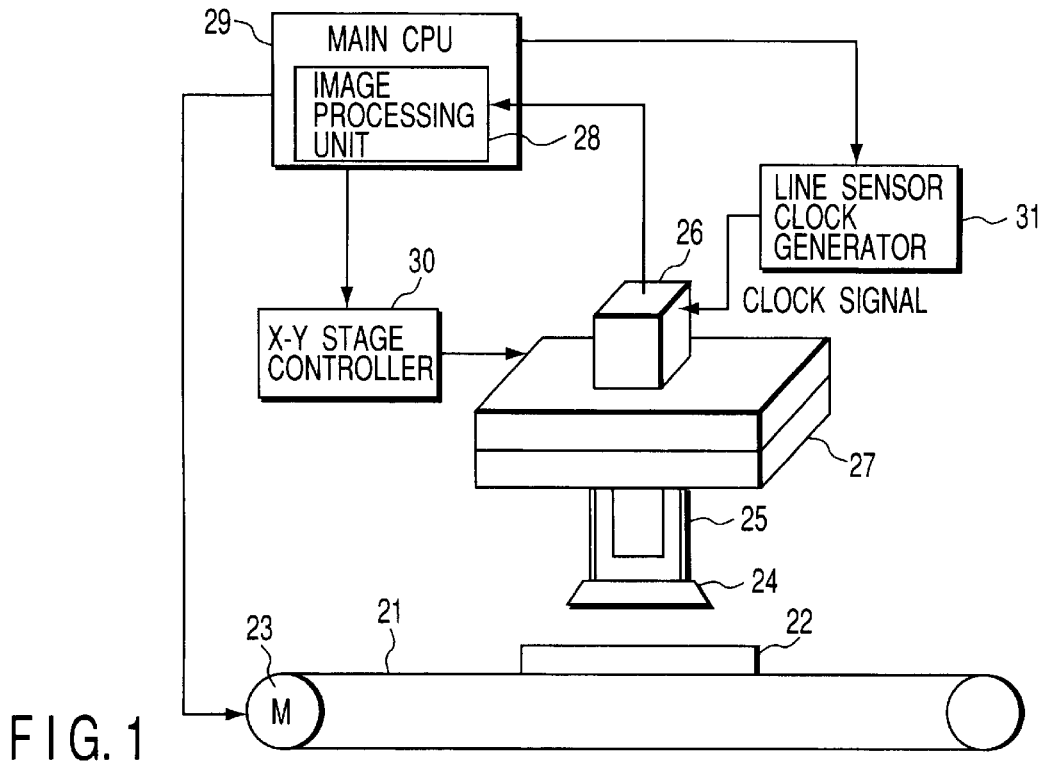
FIG. 1 is a block diagram showing the structure of an image processing system according to the first embodiment of the present invention.

Embodiments of the present invention will now be described with reference to accompanying drawings.

In these embodiments, like elements are denoted by the same reference numerals to correspond to each other.

First Embodiment

FIG. 1 is a block diagram showing the basic structure of the first embodiment of the present invention.

That is, as shown in FIG. 1, an object 22 to be examined, such as a print circuit is placed on a conveyer belt 21 and moved by a conveying motor 23.

A line sensor 26 picks up an image of a surface of the object 22, an illumination device 24 illuminates the surface of the object 22, and an optical system 25 forms the image of the surface of the object 22 on the line sensor 26 at a predetermined magnification.

The illuminating device 24, the optical system 25 and the line sensor 26 are built in the X-Y stage 27 as an integral unit, and thus the entire surface of the object 22 can be scanned.

The main CPU 29 is designed to control the system in its entirety, and it outputs an instruction of ON/OFF control of the conveying motor 23, a speed or acceleration with respect to the X-Y stage controller 30, and movement thereof.

Further, the main CPU 29 outputs a clock selection instruction signal to the line sensor clock generator 31.

The line sensor clock generator 31 changes a clock signal in accordance with the clock selection instruction signal from the main CPU 29, and outputs the clock signal to the line sensor 26.

The image signal obtained by the line sensor 26 is fetched in the image processing unit 28 built in the main CPU 29, where the signal is processed. Then, the processed image signal is subjected to the detection of a defect on the surface of the object 22 and to the judgment as to whether the object is good or no good.

In the first embodiment having the above-described structure, when the object 22 placed on the conveyer belt 21 is conveyed to a predetermined test position, the conveying motor 23 is stopped.

After the object 22 reaches the test position, the speed instruction and movement instruction are outputted to the X-Y stage controller 30 from the main CPU 29, in accordance with the test pattern examination on the basis of the test area of the object 22, assigned in advance by the main CPU 29.

At the same time, the main CPU 29 outputs a clock selection instruction signal corresponding to the speed instructed to the X-Y stage controller 30 is outputted to the line sensor clock generator 31.

Figure 2:
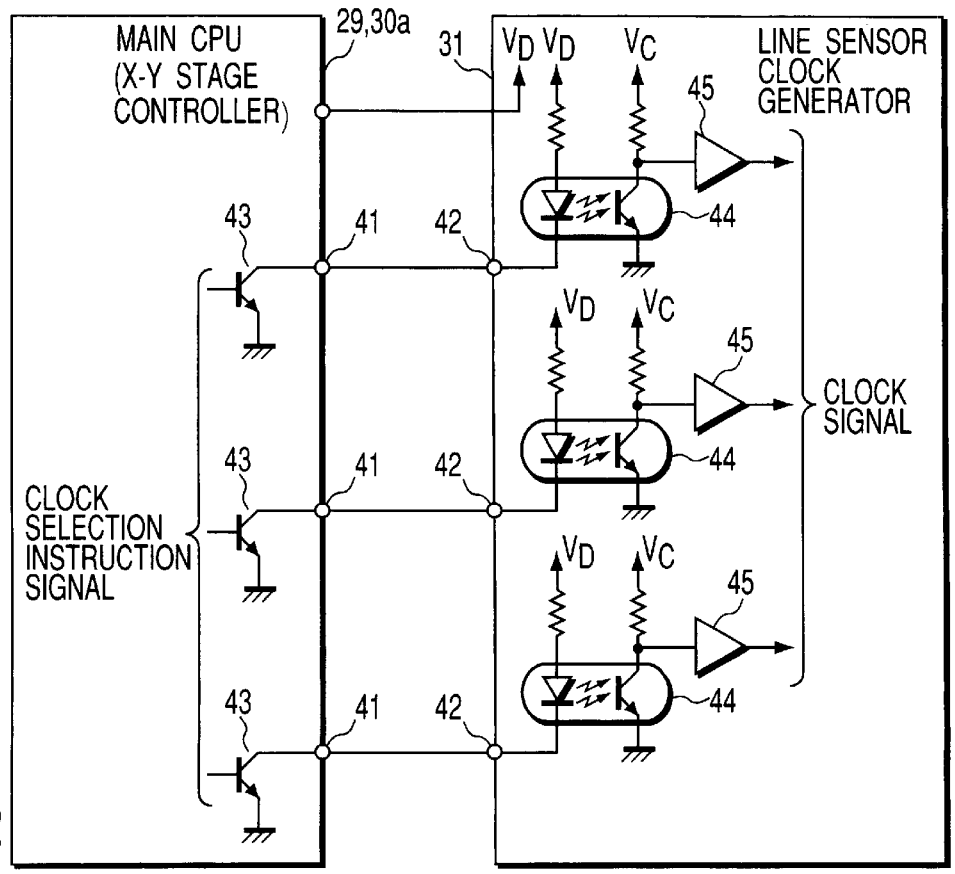
FIG. 2 is a circuit diagram showing the main CPU and the line sensor clock generator shown in FIG. 1 are connected to each other.

FIG. 2 is a circuit diagram showing how the main CPU and the line sensor clock generator shown in FIG. 1 are connected to each other, and it illustrates a hardware structure in which a clock selection instruction signal is outputted to the line sensor clock generator 31 from the main CPU 29.

As shown in FIG. 2, 3-bit parallel output ports 41 are assigned to the main CPU 29.

Further, 3-bit parallel input ports 42 corresponding to the parallel output ports 41 are assigned to the line sensor clock generator 31.

In this case, clock selection instruction signals are transmitted to the parallel output ports 41 from three transistors 43 provided in the main CPU 29.

On the other hand, in the line sensor clock generator 31, three photo-couplers 44 are connected to the respective parallel input ports 42.

To each of the photo-couplers 44, an amplifier 45 is connected, and clock signals are outputted via the amplifiers 45 to the line sensor 26 shown in FIG. 1.

With the above-described structure, a clock rate patterns of 8 ($=2^3$) different versions. Thus, when the line sensor clock generator 31 selects clock signals of such an 8 different versions that can satisfy the relationship represented by the above formula (4) in accordance with the movement speed of the X-Y stage 27, the image signal transfer speed can be changed.

In this manner, the line sensor clock generator 31 outputs a clock signal corresponding to a clock rate pattern selected on the basis of a clock selection signal from the main CPU 29, to the line sensor 26.

At the same time, the X-Y stage controller 30 outputs a drive signal for moving the stage by an instructed amount at a speed instructed by the main CPU 29, to the X-Y stage 27.

As the X-Y stage 27 moves, the line sensor 26 moves relative to the object 22, and image signals within a desired test range of the object 22 are fetched in a line-by-line manner in the image processing unit 28.

The image processing unit 28 carries out an image processing each time the image signals within a desired test range of the object 22 are fetched, and thus the detection of a defect on the surface of the object 22 is carried out.

In a series of image processing operations described above, when there a great number of defects are detected on the surface of the object 22, it is considered that the time required for the image processing of a certain area will be longer as compared to the case where there are less defects.

If nothing is done for this, there is a possibility that the image signal transfer speed becomes higher than the image processing speed of the image processing unit 28, resulting in that some areas of an image cannot be appropriately processed.

In this case, the main CPU 29 sets the speed instruction output to the X-Y stage controller 30 at lower than before.

At the same time, a clock selection signal corresponding to the clock rate which is determined from the formula (4) univocally with respect to the speed of the X-Y stage 27, is outputted to the line sensor clock generator 31, and the clock rate of the clock signal supplied to the line sensor 26 is varied such as to satisfy the formula (4).

With the above-described structure, when the movement speed of the X-Y stage 27 is changed, the clock rate of the line sensor 26 is automatically changed such as to satisfy the formula (4). Therefore, the transfer speed of images can be adjusted without having a fetched image being distorted or defocused.

As described above, according to the first embodiment, the image signal transfer speed can be adjusted to match with the image processing speed of the image processing unit 28 without distorting or defocusing an image, and therefore, the optimal image fetching speed which is in accordance with the image processing speed can be achieved without significantly decreasing the test speed.

It should be noted that in the first embodiment, the clock rate of the clock signal supplied to the line sensor 26 is determined with respect to the movement speed of the X-Y stage 27 such as to satisfy the formula (4); however alternatively, the movement speed of the X-Y stage 27 may be determined with respect to the clock rate such as to satisfy the formula (4).

In this case, it suffices if the clock selection instruction signal is outputted from the main CPU 29 to the line sensor clock generator 31 so as to be able to select a clock signal which matches with the image signal transfer speed, for the image processing speed.

Second Embodiment

Figure 3:
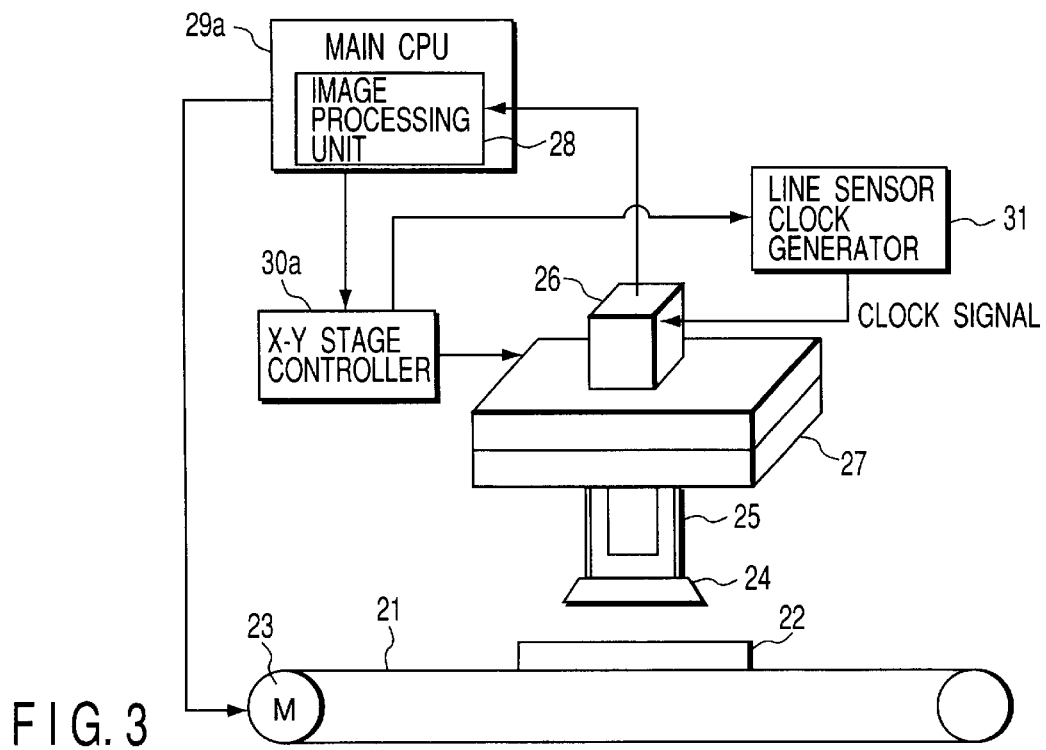
FIG. 3 is a block diagram showing the structure of an image processing system according to the second embodiment of the present invention.
Figure 4:
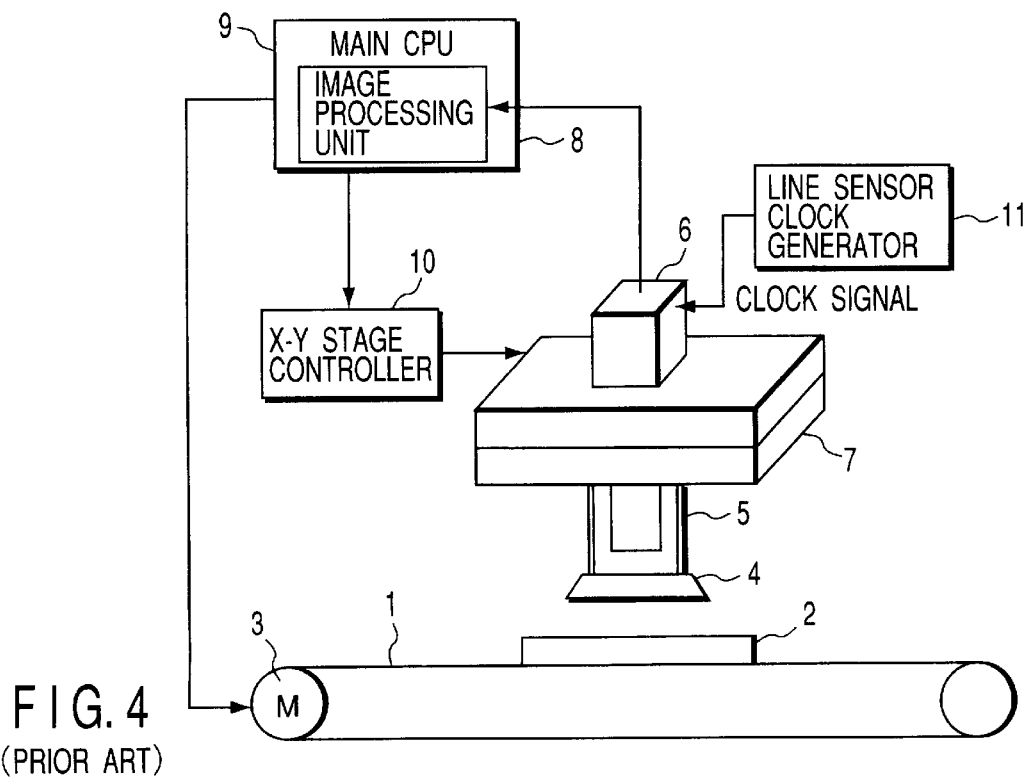
FIG. 4 is a block diagram showing the structure of an image processing system according to the conventional technique.

FIG. 3 is a block diagram showing the basic structure of the second embodiment of the present invention.

That is, as shown in FIG. 3, the second embodiment is different from the first one only in the aspect of how a clock selection instruction signal is given to the line sensor clock generator 31.

In the second embodiment, a clock selection instruction signal for the line sensor clock generator 31 is given not from the main CPU 29a but from the X-Y stage controller 30a.

Therefore, 3-bit parallel output ports 41 are provided for the X-Y stage controller 30a as shown in FIG. 2, and clock selection instruction signals are outputted from the parallel output ports 41 to the like sensor clock generator 31.

In the second embodiment, when it becomes necessary to lower the transfer speed of transferring an image from the line sensor 26 for a similar reason to that discussed in the first embodiment, the main CPU 29a sets the speed instruction to be outputted to the X-Y stage controller 30a lower than before.

Thus, the X-Y stage controller 30a outputs a drive signal to the X-Y stage 27 on the basis of its original function.

At the same time, the X-Y stage controller 30a outputs a clock selection instruction signal, and outputs a clock selection signal corresponding to the clock rate which is determined from the formula (4) univocally with respect to the speed of the X-Y stage 27, to the line sensor clock generator 31.

According to the second embodiment, the optimal image fetching speed which is in accordance with the image processing speed can be achieved without distorting or defocusing an image or without significantly decreasing the test speed, as in the case of the first embodiment.

Particularly, in the second embodiment, the X-Y stage controller 30a outputs a clock selection instruction signal to the line sensor clock generator 31, and therefore the speed of the X-Y stage 30a and the clock rate of the line sensor 26 can be varied only by outputting the speed instruction to the X-Y stage controller 30a.

Therefore, according to the second embodiment, the optimal image fetching speed which is in accordance with the image processing speed can be set more easily than in the case of the first embodiment.

The present invention is not limited to the above-described embodiments, but can be remodeled into various versions.

In the case where an object lens of a different magnification is built in the optical system, it becomes necessary to change the movement speed of the X-Y stage 27 for the reason that the ratio between the vertical and horizontal directions of the image does not become 1:1 if the magnification of the objective lens is varied.

In the case where the movement speed of the X-Y stage 27 is varied in accordance with the magnification of the optical system, it is preferable that the clock rate of the clock signal supplied to the line sensor 26 should be varied so as to satisfy the relationship represented by the formula (4). In this manner, an effect similar to the above embodiment can be obtained.

It should be noted here that in the first and second embodiment, the illuminating device 24, the optical system 25 and the line sensor 26 are built on the X-Y stage 27, and moved relative to the object 22; however it is alternatively possible that the object 22 is mounted on the X-Y stage 27 to be moved relatively.

Further, the clock selection instruction signal to the line sensor clock generator 31 may be outputted using a general-use communication interface such as RS232C or GP-IB.

As described above, according to the present invention, a clock signal is determined in relation with the movement speed of the movement means, the magnification of the optical system and the processing speed of the image processing means, and supplied to the line sensor. In this manner, the optimal image fetching speed which is in accordance with the image processing speed can be achieved, thus making it possible to avoid the distortion or defocusing of the image.

Further, according to the present invention, the image processing means or moving means which relates to the clock signal generating means in a mutual manner, controls the clock signal generating means, thus making it possible to supply an optimal clock signal to the line sensor.

Therefore, according to the present invention, the conventional problem can be solved, and it is possible to provide an image processing system which uses a line sensor capable of achieving an optimal image fetching speed which is in accordance with the image processing capability (image processing speed) without distorting or defocusing the image.

What is claimed is:

1. An image processing system comprising:

illumination means for illuminating a surface of an object to be examined;

a line sensor for picking up an image of the surface of the object;

an optical system for imaging the image of the surface of the object on the line sensor;

movement means for moving the illumination means and the optical system relative to the object;

image processing means for processing an image signal from the line sensor;

clock signal generating means capable of changing the clock rate of the clock signal supplied to the line sensor; and controlling means for controlling the movement speed of the movement means and the clock rate of the liner sensor such as to satisfy a relational formula:

$$v=(mx)/(ca)$$

where m: the magnification of the optical system x: the size of an imaging element of the line sensor, and a: the number of pixels on one line of the line sensor, thereby adjusting the image signal transfer speed of the line sensor to match the processing speed of the image processing means.

2. An image processing system according to claim 1, wherein in that the controlling means changes the clock rate (c) of the line sensor such as to satisfy a relational formula: $v=(mx)/(ca)$ in accordance with a change in at least one of the movement speed (v) of the movement means and the magnification (m) of the optical system.

3. An image processing system according to claim 1, wherein the controlling means changes at least one of the movement speed (v) of the movement means and the magnification (m) of the optical system such as to satisfy a relational formula: v=(mx)/(ca) in accordance with a change in the clock rate (c) of the line sensor.

4. An image processing system according to claim 1, wherein the clock signal generating means is controlled by the main central processing unit (CPU) which includes the image processing means.

5. An image processing system according to claim 1, wherein the clock signal generating means is controlled by the controller of the movement means.

6. An image processing system according to claim 1 wherein:
   parallel input ports of a plurality of bits, which correspond to parallel output ports of a plurality of bits, are assigned to the clock signal generating means, and
   a line sensor clock generator is used as means for supplying a clock signal to the line sensor, on the basis of the clock selection signal from the parallel output ports.

7. An image processing system according to claim 4 wherein:
   the parallel output ports are assigned to the main central processing unit (CPU) including the image processing means,
   the parallel input ports are assigned to the clock signal generating means, and
   a clock rate pattern which corresponds to each of clock selection instruction signals of a plurality of bits, transmitted/received between the parallel output ports and the parallel input ports, is selected.

8. An image processing system according to claim 5 wherein:
   parallel input ports of a plurality of bits, which correspond to parallel output ports of a plurality of bits, are assigned to the clock signal generating means, and
   a line sensor clock generator is used as means for supplying a clock signal to the line sensor, on the basis of the clock selection signal from the parallel output ports.

9. An image processing system according to claim 6 wherein:
   the parallel output ports are assigned to the main central processing unit (CPU) including the image processing means,
   the parallel input ports are assigned to the clock signal generating means, and
   a clock rate pattern which corresponds to each of clock selection instruction signals of a plurality of bits, transmitted/received between the parallel output ports and the parallel input ports, is selected.

10. An image processing system according to claim 7 wherein:
    the parallel output ports are assigned to the main central processing unit (CPU) including the image processing means,
    the parallel input ports are assigned to the clock signal generating means, and
    a clock rate pattern which corresponds to each of clock selection instruction signals of a plurality of bits, transmitted/received between the parallel output ports and the parallel input ports, is selected.

11. An image processing system according to claim 8 wherein:
    the parallel output ports are assigned to the main central processing unit (CPU) including the image processing means,
    the parallel input ports are assigned to the clock signal generating means, and
    a clock rate pattern which corresponds to each of clock selection instruction signals of a plurality of bits, transmitted/received between the parallel output ports and the parallel input ports, is selected.

12. An image processing system according to claim 6 wherein:
    the movement means includes a controller driven and controlled by the CPU;
    the parallel output ports for transmitting the clock selection instruction signals of said plurality of bits, are assigned to the controller;
    the parallel input ports for receiving the clock selection instruction signals of said plurality of bits, are assigned to the clock signal generating means; and
    a clock rate pattern which corresponds to each of clock selection instruction signals of a plurality of bits, transmitted/received between the parallel output ports and the parallel input ports, is selected.

13. An image processing system according to claim 7 wherein:
    the movement means includes a controller driven and controlled by the CPU;
    the parallel output ports for transmitting the clock selection instruction signals of said plurality of bits, are assigned to the controller;
    the parallel input ports for receiving the clock selection instruction signals of said plurality of bits, are assigned to the clock signal generating means; and
    a clock rate pattern which corresponds to each of clock selection instruction signals of a plurality of bits, transmitted/received between the parallel output ports and the parallel input ports, is selected.

14. An image processing system according to claim 8 wherein:
    the movement means includes a controller driven and controlled by the CPU;
    the parallel output ports for transmitting the clock selection instruction signals of said plurality of bits, are assigned to the controller;
    the parallel input ports for receiving the clock selection instruction signals of said plurality of bits, are assigned to the clock signal generating means; and
    a clock rate pattern which corresponds to each of clock selection instruction signals of a plurality of bits, transmitted/received between the parallel output ports and the parallel input ports, is selected.

15. An image processing system according to claim 6 wherein:
    the clock selection instruction signal is sent to the parallel output ports of said plurality of bits from a predetermined number of transistors provided in the main CPU.

16. An image processing system according to claim 7 wherein:
    the clock selection instruction signal is sent to the parallel output ports of said plurality of bits from a predetermined number of transistors provided in the main CPU.

17. An image processing system according to claim 8 wherein:
    the clock selection instruction signal is sent to the parallel output ports of said plurality of bits from a predetermined number of transistors provided in the main CPU.

18. An image processing system according to claim 9 wherein:
    the clock selection instruction signal is sent to the parallel output ports of said plurality of bits from a predetermined number of transistors provided in the main CPU.

19. An image processing system according to claim 12 wherein:
the clock selection instruction signal is sent to the parallel output ports of said plurality of bits from a predetermined number of transistors provided in the main CPU.

20. An image processing system according to claim 7 wherein:
a predetermined number of photo-couplers provided in the line sensor clock generator are connected to the parallel output ports of said plurality of bits, and
clock signals are supplied from the photo-couplers via respective amplifiers to the line sensor.

21. An image processing system according to claim 7 wherein:
a predetermined number of photo-couplers provided in the line sensor clock generator are connected to the parallel output ports of said plurality of bits, and
clock signals are supplied from the photo-couplers via respective amplifiers to the line sensor.

22. An image processing system according to claim 8 wherein:
a predetermined number of photo-couplers provided in the line sensor clock generator are connected to the parallel output ports of said plurality of bits, and
clock signals are supplied from the photo-couplers via respective amplifiers to the line sensor.

* * * * *